(12) United States Patent
Lin

(10) Patent No.: US 8,245,597 B2
(45) Date of Patent: Aug. 21, 2012

(54) PEDAL STRUCTURE OF BICYCLE

(76) Inventor: Chang Hui Lin, Changhu (TW)

( * ) Notice: Subject to any disclaimer, the term of this patent is extended or adjusted under 35 U.S.C. 154(b) by 368 days.

(21) Appl. No.: 12/718,961

(22) Filed: Mar. 6, 2010

(65) Prior Publication Data

US 2011/0214530 A1  Sep. 8, 2011

(51) Int. Cl.
*B62M 3/08* (2006.01)
(52) U.S. Cl. .......................... 74/594.6; 74/594.4; 36/131
(58) Field of Classification Search ............... 74/594.4, 74/594.6; 36/131
See application file for complete search history.

(56) References Cited

U.S. PATENT DOCUMENTS

| | | | | |
|---|---|---|---|---|
| 5,497,680 A | * | 3/1996 | Nagano | 74/594.6 |
| 6,708,584 B2 | * | 3/2004 | Muraoka | 74/594.6 |
| 7,856,904 B2 | * | 12/2010 | Lin | 74/594.6 |
| 2005/0252337 A1 | * | 11/2005 | Chen | 74/594.6 |

* cited by examiner

*Primary Examiner* — Vinh Luong

(57) ABSTRACT

A pedal structure of a bicycle includes a retaining assembly having an arcuate engaging tab, a limiting piece mounted, and a pushing block, the limiting piece including a groove attached thereon, the pedal including an arcuate hook disposed on a front side thereof, an aperture mounted on a middle section thereof, a chamber fixed on a rear side thereof, the chamber including two slots attached on top ends of two sides thereof respectively, a defining plane formed on an upper side thereof, and two peripheral plates arranged on the two sides thereof individually, the adjusting member including a rotating disc and a stem having a recess, and an eccentric opening communicating with the recess, the recess includes a tee locking member having a vent, two sliding projections, and a protrusion, and a shank being inserted to the eccentric opening and the vents to be retained in the recess.

6 Claims, 5 Drawing Sheets

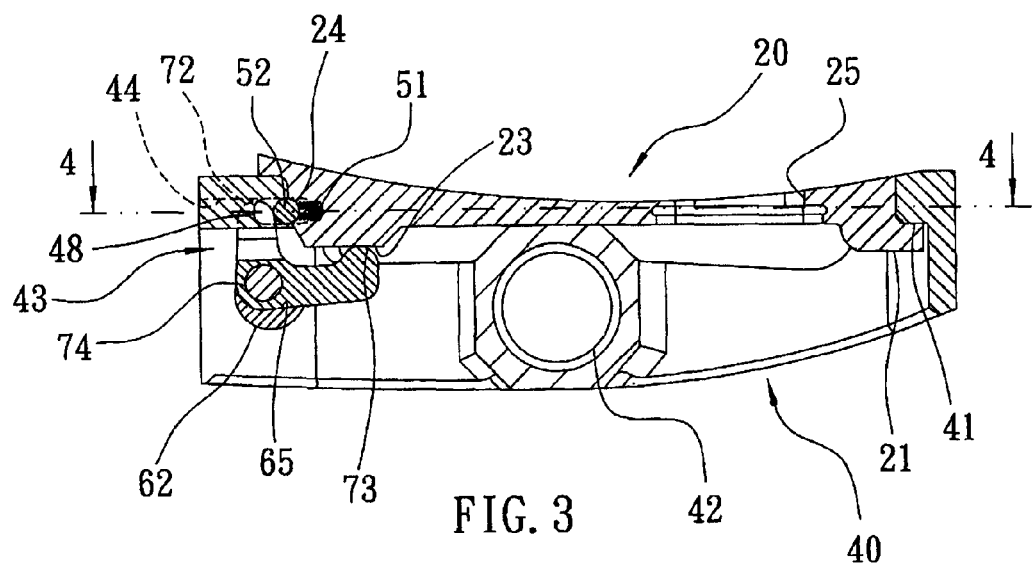
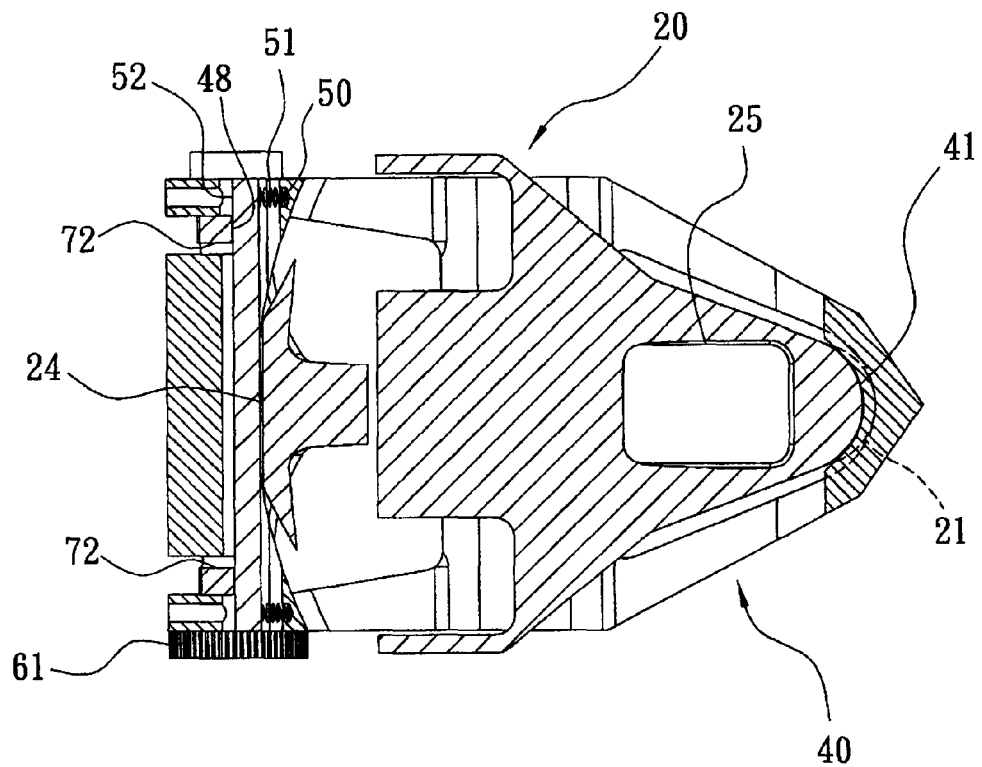
FIG. 4

PEDAL STRUCTURE OF BICYCLE

BACKGROUND OF THE INVENTION

1. Field of the Invention

The present invention relates to a pedal structure of a bicycle that can prevent the retaining assembly from injuring a rider under excessive force.

2. Description of the Prior Art

A conventional pedal structure of a bicycle is comprised of a retaining assembly and a pedal to prevent the ankle from slide when stepping the pedal.

The conventional retaining assembly is engaged with the pedal, and it is disengaged from the pedal manually, hence a gap generates between the retaining assembly and the pedal after a period of time to cause an injury when moving the ankle on the pedal. Furthermore, the rider can not sense whether the retaining assembly has disengaged from the pedal to move the ankle from the pedal.

The present invention has arisen to mitigate and/or obviate the afore-described disadvantages.

SUMMARY OF THE INVENTION

The primary object of the present invention is to provide a pedal structure of a bicycle which is capable of overcoming the shortcomings of the conventional pedal structure of the bicycle thereof.

Another object of the present invention is to provide a pedal structure of a bicycle that can prevent the retaining assembly from injuring a rider under excessive force.

A pedal structure of a bicycle in accordance with a preferred embodiment of the present invention comprises:

a retaining assembly, a pedal, and an adjusting member, characterized in that:

the retaining assembly includes an arcuate engaging tab disposed on a front edge thereof, a limiting piece mounted on a rear edge thereof, and a pushing block fixed on a bottom surface of the rear edge thereof, the limiting piece includes a groove attached on a suitable position thereof, the pedal includes an arc-shaped hook disposed on a front side thereof, an aperture mounted on a middle section thereof, and a chamber fixed on a rear side thereof, the chamber includes two slots attached on top ends of two sides thereof respectively, includes a defining plane formed on an upper side thereof, and includes two peripheral plates arranged on the two sides thereof individually, each side plate includes a bore, an oval orifice, and a pore disposed on a rear side thereof to communicate with the oval orifice, the adjusting member includes a rotating disc and a stem, the stem includes a recess fixed thereon, and an eccentric opening communicating with the recess, the recess includes a tee locking member received thereon, the tee locking member includes a vent formed thereon, two sliding projections attached on two sides thereof respectively, and a protrusion secured on a middle section of a front side thereof, the sliding projections slide in the slots individually, and a shank is inserted to the eccentric opening and the vents so as to be retained in the recess.

BRIEF DESCRIPTION OF THE DRAWINGS

FIG. 3 is a cross sectional view showing the assembly of a retaining assembly of the pedal structure of the bicycle according to the preferred embodiment of the present invention;

FIG. 4 is another cross sectional view showing the assembly of the retaining assembly of the pedal structure of the bicycle according to the preferred embodiment of the present invention;

DETAILED DESCRIPTION OF THE PREFERRED EMBODIMENTS

Figure 1:
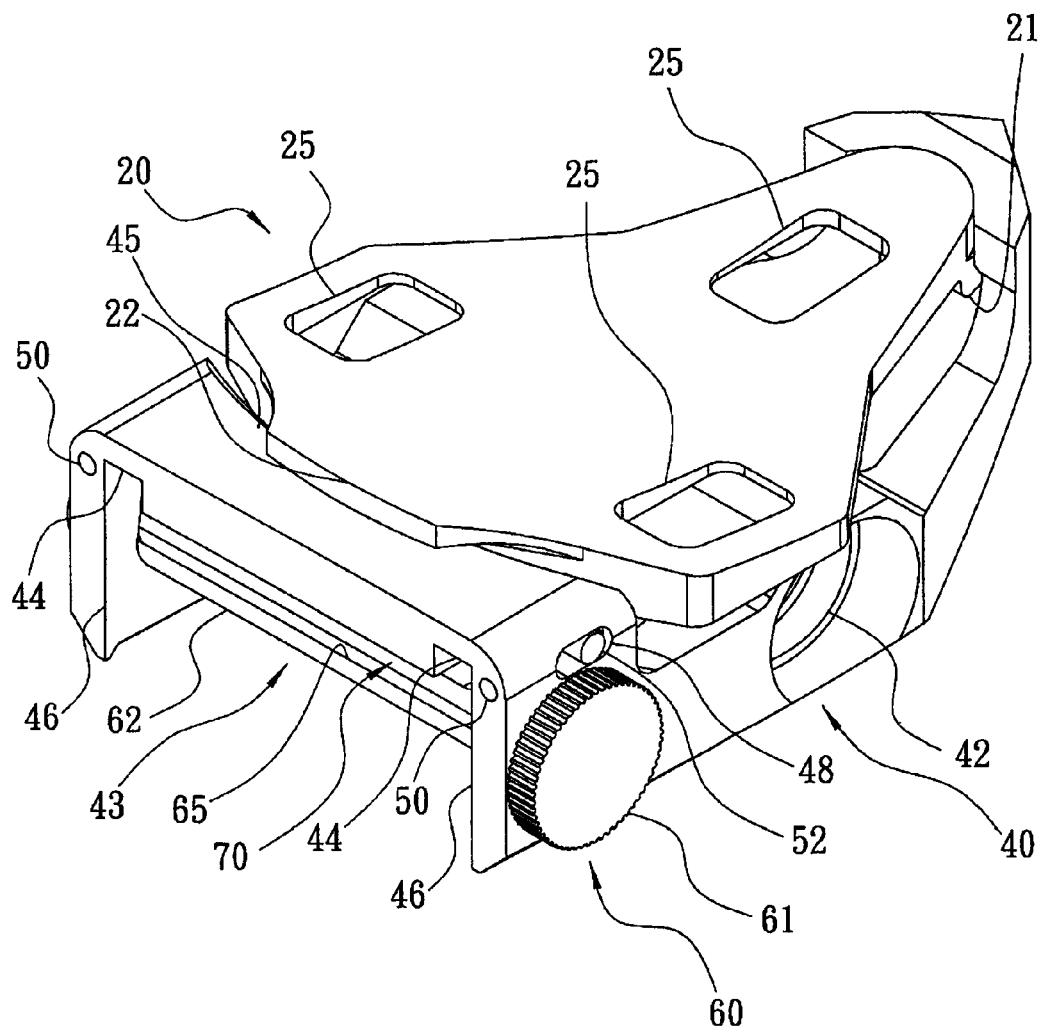
FIG. 1 is a perspective view showing the assembly of a pedal structure of a bicycle according to a preferred embodiment of the present invention.
Figure 2:
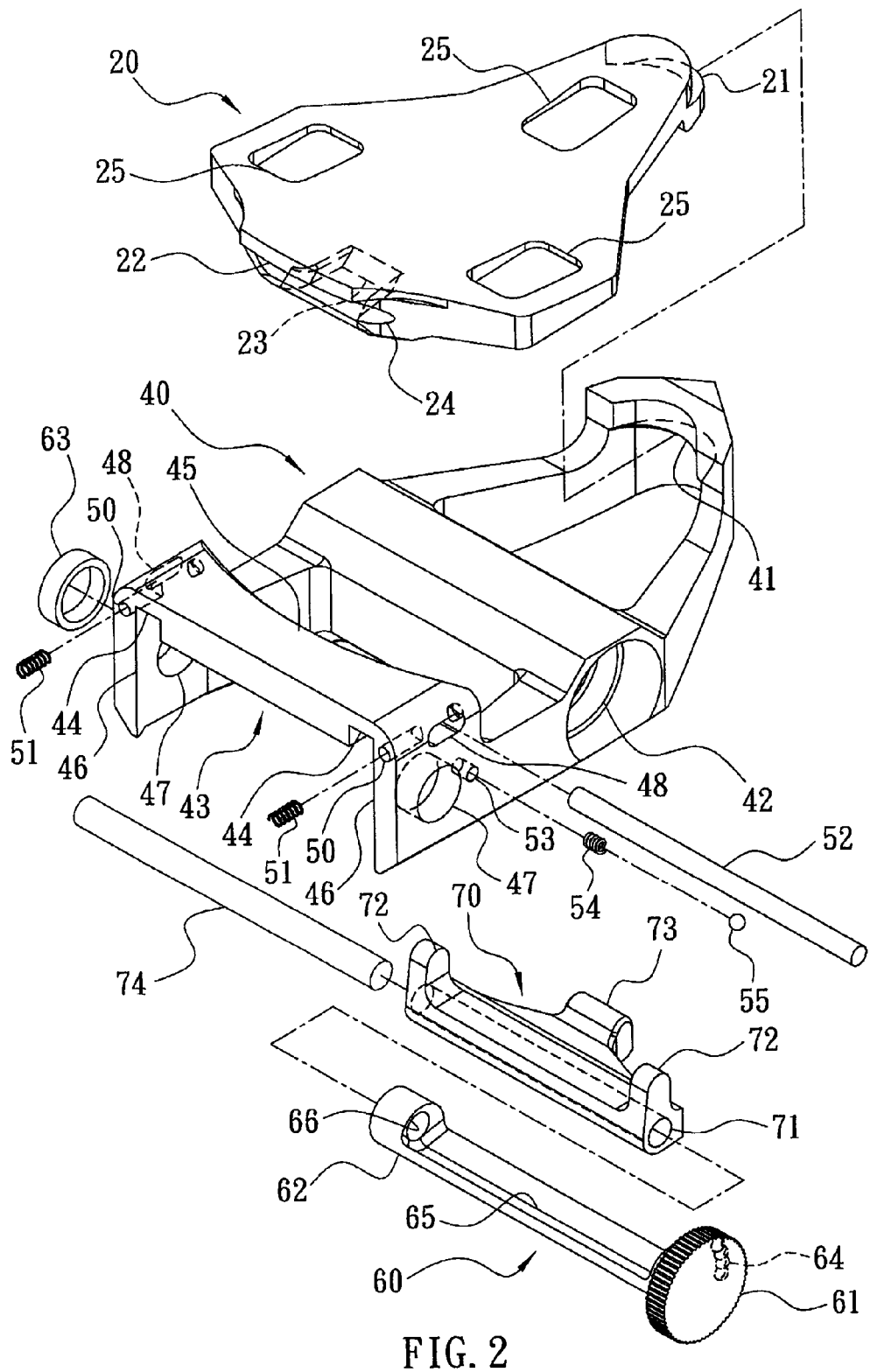
FIG. 2 is a perspective view showing the exploded components of the pedal structure of the bicycle according to the preferred embodiment of the present invention.
Figure 5:
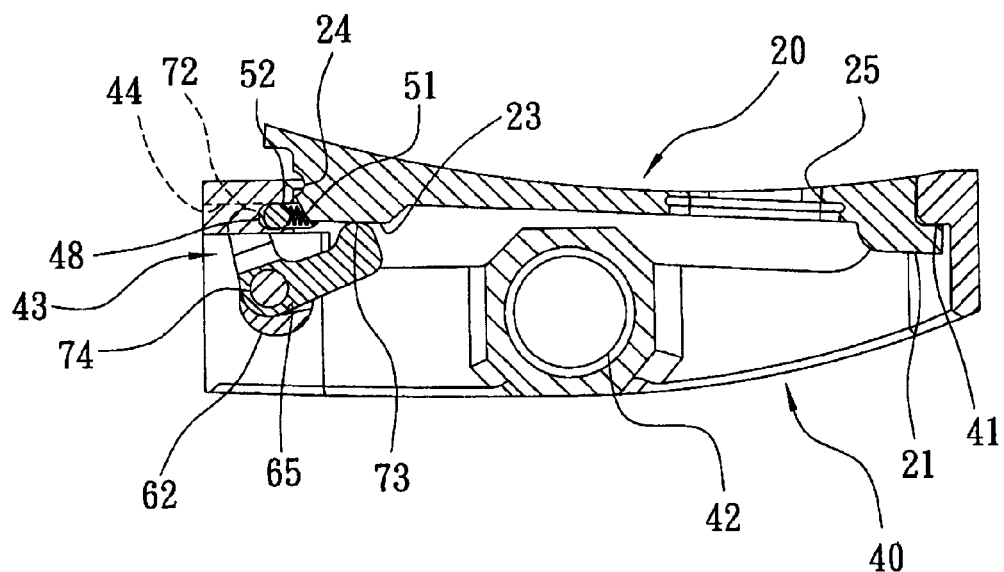
FIG. 5 is a cross sectional view showing the operation of the pedal structure of the bicycle according to the preferred embodiment of the present invention.

The present invention will be clearer from the following description when viewed together with the accompanying drawings, which show, for purpose of illustrations only, the preferred embodiment in accordance with the present invention.

Referring to FIGS. 1-6, a pedal structure of a bicycle in accordance with a preferred embodiment of the present invention comprises a retaining assembly 20, a pedal 40, and an adjusting member 60.

The retaining assembly 20 includes an arcuate engaging tab 21 disposed on a front edge thereof, a limiting piece 22 mounted on a rear edge thereof, and a pushing block 23 fixed on a bottom surface of the rear edge thereof, the limiting piece 22 includes a groove 24 attached on a suitable position thereof, and the retaining assembly 20 also includes a plurality of holes 25 to retain with a spiked shoes. The pedal 40 includes an arc-shaped hook 41 disposed on a front side thereof, an aperture 42 mounted on a middle section thereof, and a chamber 43 fixed on a rear side thereof, the chamber 43 includes two slots 44 attached on top ends of two sides thereof respectively, includes a defining plane 45 formed on an upper side thereof, and includes two peripheral plates 46 arranged on the two sides thereof individually, each side plate 46 includes a bore 47 to receive the adjusting member 60, an oval orifice 48 to receive a shaft 52, and a pore 50 disposed on a rear side thereof to communicate with the oval orifice 48. The pore 50 includes a first spring 51 received therein to push the shaft 52 to move in the oval orifice 48, and the adjusting member 60 includes a rotating disc 61 and a stem 62 to be inserted to the bore 47 of the peripheral plate 46 and the chamber 43, and then to be positioned in the chamber 43 by using a fitting loop 63. The rotating disc 61 includes a number of limit trenches 64 arranged therearound to match with a second spring 54 and a ball 55, both of which are received in a ventilation 53 of the peripheral plate 46 so that when the rotating disc 61 is rotated, the ball 55 is positioned in the limit trench 64 to adjustably rotate the shaft 52. The stem 62 includes a recess 65 fixed thereon, and an eccentric opening 66 communicating with the recess 65, the recess 65 includes a tee locking member 70 received thereon, the tee locking member 70 includes a vent 71 formed thereon, two sliding projections 72 attached on two sides thereof respectively, and a protrusion 73 secured on a middle section of a front side thereof, the sliding projections 72 slide in the slots 44 individually, and a shank 74 is inserted to the eccentric opening 66 and the vents 71 so as to be retained in the recess 65.

Figure 6:
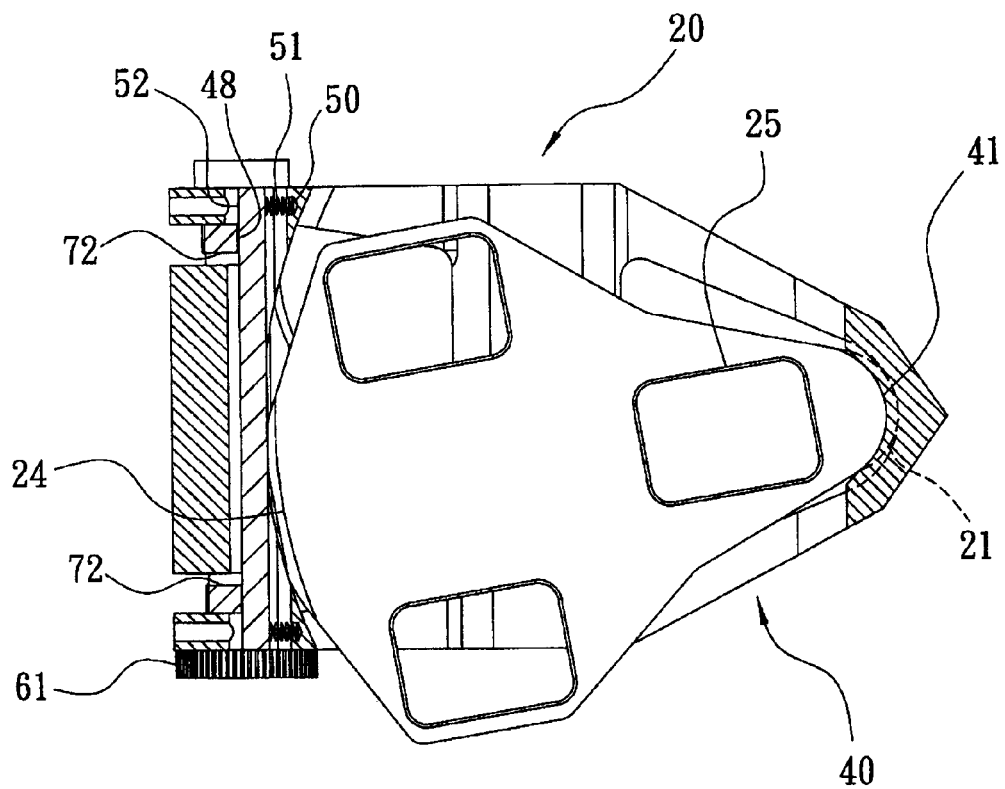
FIG. 6 is another cross sectional view showing the operation of the pedal structure of the bicycle according to the preferred embodiment of the present invention.
Figure 7:
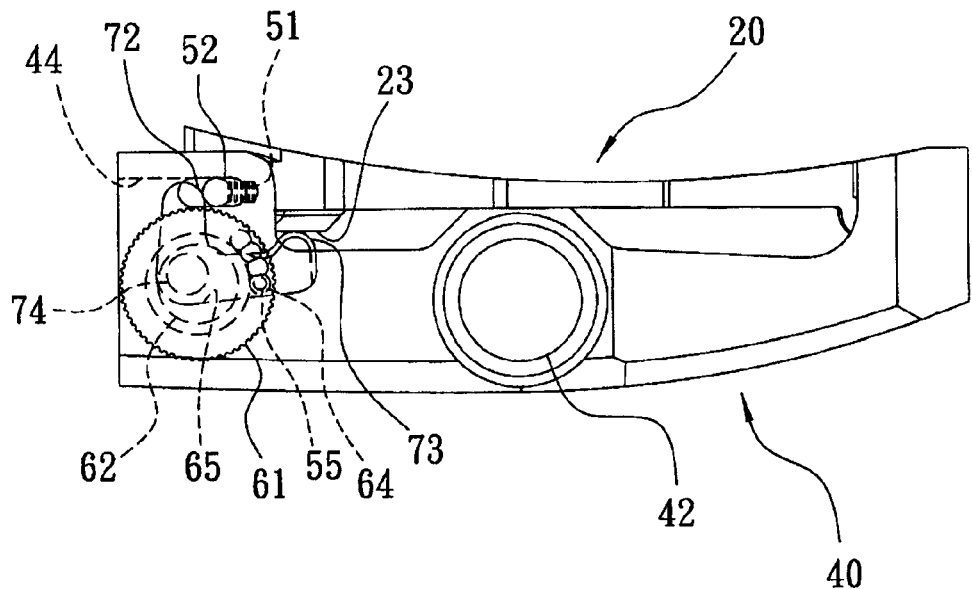
FIG. 7 is a plan view showing the operation of the pedal structure of the bicycle according to the preferred embodiment of the present invention.
Figure 8:
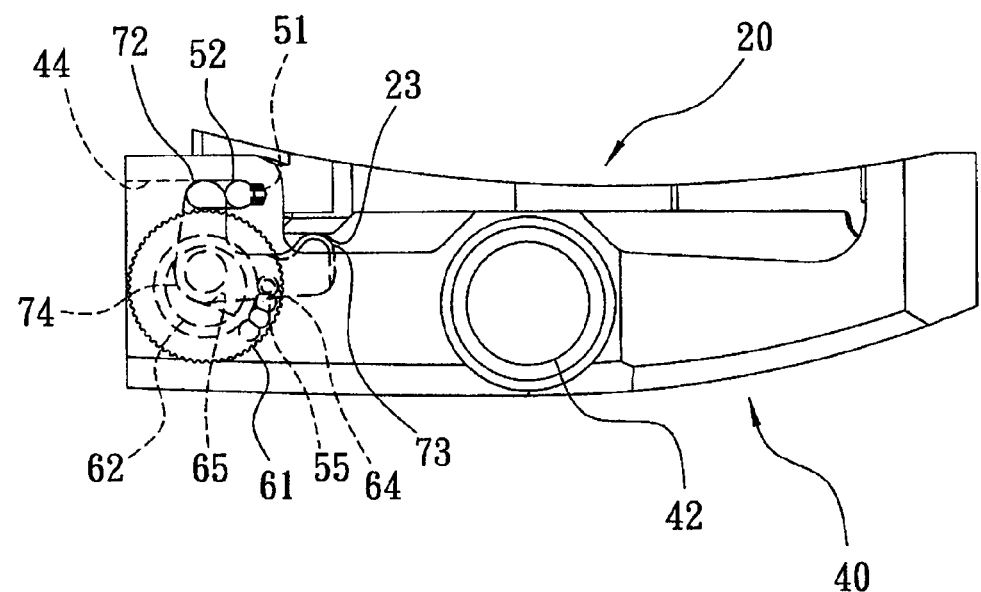
FIG. 8 is another plan view showing the operation of the pedal structure of the bicycle according to the preferred embodiment of the present invention.

In operation, as shown in FIGS. 6 and 7, the rotating disc 61 is rotated to actuate the eccentric opening 66 of the stem 62 to rotate so that the tee locking member 70 moves eccentrically, and the sliding projections 72 of the tee locking member 70 push against the shaft 52 to obtain fastening or unfastening purpose.

When a rider is desired to engage the retaining assembly 20 with the pedal 40, the arcuate engaging tab 21 is placed to the arc-shaped hook 20 of the pedal 40, and the retaining assembly 20 is pressed by rider's ankle so that the limiting piece 22 contacts with the defining plane 45, and the groove 24 of the limiting piece 22 retains with the shaft 52. Because the pushing block 23 presses the protrusion 73 of the tee locking member 70, the tee locking member 70 rotates frontward along the shank 74, and the sliding projections 72 push the shaft 52 to move frontward so that the shaft 52 is retained in the groove 24, hence when the rider steps the pedal 40, the retaining assembly 20 does not disengage from the pedal 40.

Furthermore, when the rider intends to disengage the retaining assembly 20 from the pedal 40, the retaining assembly 20 is rotated by way of the arcuate engaging tab 21 to be disengaged from the pedal 40, and the tee locking member 70 pushes the shaft 52 by using the first spring 51, such that the protrusion 73 of the tee locking member 70 pushes the retaining assembly 20 upward to disengage from the pedal 40 easily, thereby preventing the retaining assembly from injuring the rider under excessive force.

While we have shown and described various embodiments in accordance with the present invention, it is clear to those skilled in the art that further embodiments may be made without departing from the scope of the present invention.

What is claimed is:

1. A pedal structure of a bicycle comprising
a retaining assembly, a pedal, and an adjusting member, characterized in that:
the retaining assembly includes an arcuate engaging tab disposed on a front edge thereof, a limiting piece mounted on a rear edge thereof, and a pushing block fixed on a bottom surface of the rear edge thereof, the limiting piece includes a groove attached on a suitable position thereof, the pedal includes an arc-shaped hook disposed on a front side thereof, an aperture mounted on a middle section thereof, and a chamber fixed on a rear side thereof, the chamber includes two slots attached on top ends of two sides thereof respectively, includes a defining plane formed on an upper side thereof, and includes two peripheral plates arranged on the two sides thereof individually, each side plate includes a bore, an oval orifice, and a pore disposed on a rear side thereof to communicate with the oval orifice, the adjusting member includes a rotating disc and a stem, the stem includes a recess fixed thereon, and an eccentric opening communicating with the recess, the recess includes a tee locking member received thereon, the tee locking member includes a vent formed thereon, two sliding projections attached on two sides thereof respectively, and a protrusion secured on a middle section of a front side thereof, the sliding projections slide in the slots individually, and a shank is inserted to the eccentric opening and the vents so as to be retained in the recess.

2. The pedal structure of a bicycle as claimed in claim 1, wherein the retaining assembly also includes a plurality of holes to retain with a spiked shoes.

3. The pedal structure of a bicycle as claimed in claim 1, wherein the bore is used to receive the adjusting member, and the oval orifice is applied to receive a shaft.

4. The pedal structure of a bicycle as claimed in claim 1, wherein the pore includes a first spring received therein to push the shaft to move in the oval orifice.

5. The pedal structure of a bicycle as claimed in claim 1, wherein the adjusting member is inserted to the bore of the peripheral plate and the chamber, and then to be positioned in the chamber by using a fitting loop.

6. The pedal structure of a bicycle as claimed in claim 1, wherein the limit trench matches with a second spring and a ball, both of which are received in a ventilation of the peripheral plate so that when the rotating disc is rotated, the ball is positioned in the limit trench to adjustably rotate the shaft.

* * * * *